United States Patent [19]

Fomenko et al.

[11] 4,327,251
[45] Apr. 27, 1982

[54] AUTOMATIC TELEPHONE DIRECTORY MESSAGE SYSTEM

[75] Inventors: Joseph Fomenko, Rochester; John A. Kuecken, Pittsford; James J. Sloboda, North Rose, all of N.Y.

[73] Assignee: Radionics Inc., Webster, N.Y.

[21] Appl. No.: 130,948

[22] Filed: Mar. 17, 1980

[51] Int. Cl.³ .................... H04M 1/05; H04M 11/10
[52] U.S. Cl. .................... 179/1 SM; 179/6.08; 179/6.11; 179/18 B
[58] Field of Search ............ 179/1 SM, 18 B, 27 FH, 179/90 AN, 6.03, 6.04, 6.07, 6.08, 6.09, 6.11, 6.17

[56] References Cited

U.S. PATENT DOCUMENTS

| | | | |
|---|---|---|---|
| 3,644,675 | 2/1972 | Watlington | 179/2 AS |
| 3,715,506 | 2/1973 | Haag et al. | 179/6 E |
| 3,728,486 | 4/1973 | Kraus | 179/18 B |
| 3,793,487 | 2/1974 | Kilby | 179/6 R |
| 4,016,540 | 4/1977 | Hyatt | 179/1 SM |
| 4,031,323 | 6/1977 | Ando et al. | 179/6.11 |
| 4,060,848 | 11/1977 | Hyatt | 364/200 |
| 4,071,888 | 1/1978 | Owens | 364/200 MS |
| 4,117,263 | 9/1978 | Yeh | 179/1 SM |
| 4,121,052 | 10/1978 | Richard | 179/90 AN |
| 4,122,306 | 10/1978 | Friedman et al. | 179/6 E |
| 4,128,737 | 12/1978 | Dorais | 179/1 SM |
| 4,150,255 | 4/1979 | Theis et al. | 179/6 C |
| 4,185,170 | 1/1980 | Morino et al. | 179/1 SM |
| 4,196,311 | 4/1980 | Hoven | 179/6.11 |
| 4,211,892 | 7/1980 | Tanimoto et al. | 179/1SM |

OTHER PUBLICATIONS

*Digital Design* "Technology Trends" vol. 7, No. 3, Mar., 1977 pp. 15–16.
"New Custom Calling Services" *International Switching Symposium* 5-11-79, 179–183.

Primary Examiner—Gerald L. Brigance
Attorney, Agent, or Firm—Martin LuKacher

[57] ABSTRACT

An automatic telephone directory system is interactive with users over telephone lines and provides voice messages to callers where the user wishing to leave a message enters his user code number and numbers representing messages, which may include any phone number at which the user may be reached, if available. Messages may be removed from the directory or changed. Callers obtain the messages over the directory telephone lines by entering the user code number identifying the user party which the caller wishes to contact. Then the system transmits the voice message to the caller. The user code numbers and numbers representing the messages entered by the user are stored in separate locations in memory. The system counts calls for directory service and removes the user code number and the message accompanying it, if a call for that user is not received during a predetermined number of calls to the directory thereby enabling removal of stale messages automatically. A speech synthesizer has a vocabulary of words corresponding to the message numbers and instructional words. A microprocessor controls the system in response to the entry of user code numbers and message numbers over the directory telephone line. There may be more users than locations in memory for user and message numbers. The system provides an instructional message to users wishing to leave messages that the directory is full when the memory locations are all occupied.

17 Claims, 1 Drawing Figure

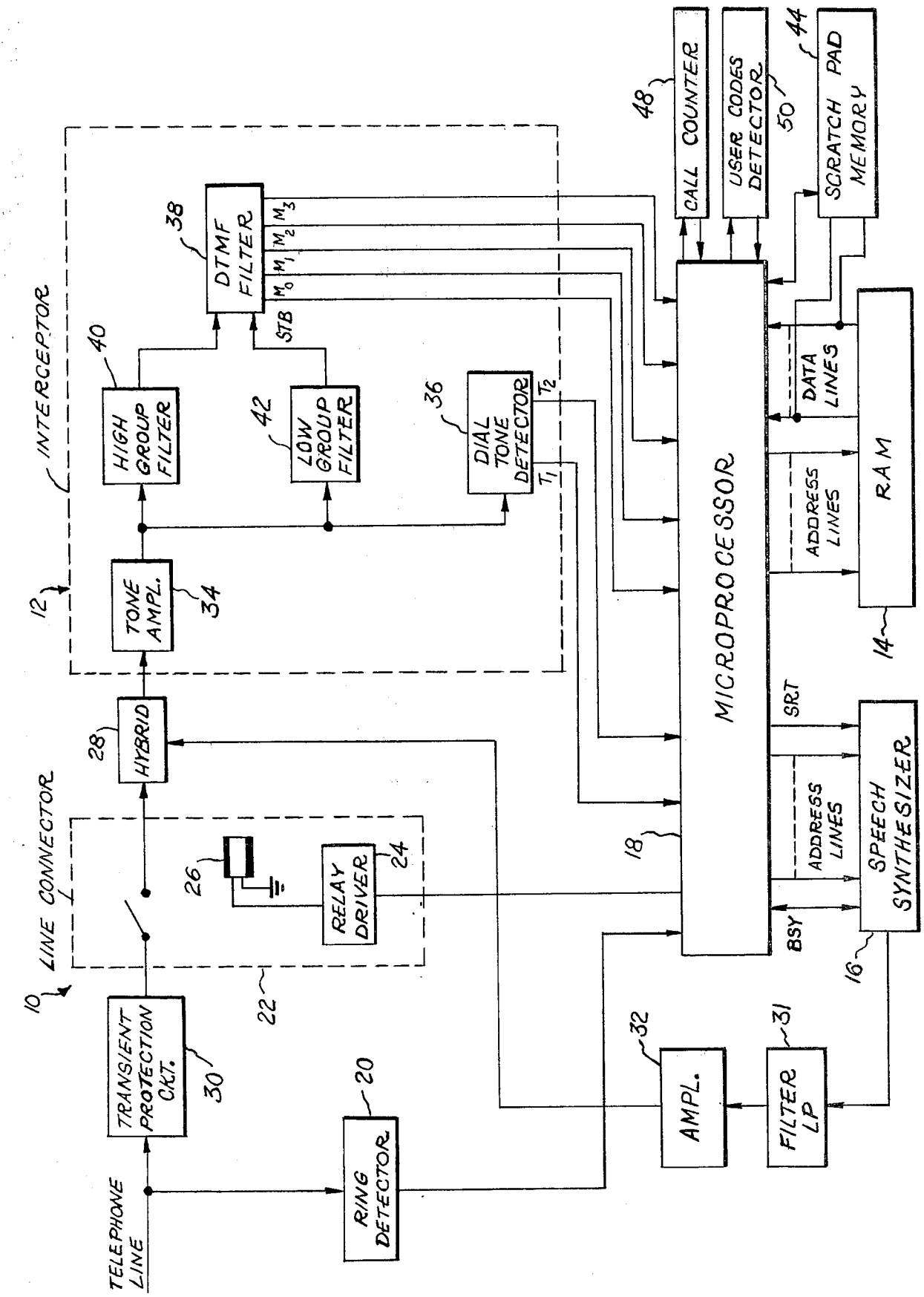

AUTOMATIC TELEPHONE DIRECTORY MESSAGE SYSTEM

DESCRIPTION

The present invention relates to an automatic telephone directory system and particularly to a directory system which is interactive with users and callers and provides for the entry of messages dialed in by users and the transmission of voice messages to callers and users without operator intercession.

The invention is especially suitable for use in connection with groups of users, such as doctors, lawyers or other professionals having telephone lines for taking messages and enables such users to leave messages for callers who are aware of their respective special access codes to receive such messages automatically. The callers may be directed to any telephone number at which the user may be reached if available. Aspects of the invention may also be used wherever selective and automatic message communication is desired.

Many attempts have been made to provide selective message communication. These for the most part have used magnetic tape recording and have been dedicated to a particular user. Multipler user systems have not generally been available. The disclosure of U.S. Pat. No. 4,122,306 issued Oct. 24, 1978 describes the use of a multi-track tape player and recorder in which different users are assigned different tracks and the tracks are accessed individually to provide selective communication with the user or a caller wishing to communicate with that user. Such systems are of limited capacity in the number of users on the directory. The tape recorders also suffer from poor reliability and must be repaired and maintained regularly for continued system operation.

Automatic voice answering systems using speech synthesizers which assemble messages from stored data under computer control have also been suggested (see the disclosures of U.S. Pat. No. 4,071,888 issued Jan. 31, 1978 and U.S. Pat. No. 4,177,263 issued Sept. 26, 1978). Such systems do not provide selective access to a large number of users for the entry of different messages, changing of messages and removal of messages from the directory, especially when the users are remote from the directory and have facilities only for calling the directory telephone line.

It is therefore an object of the present invention to provide an improved automatic telephone directory system which has facilities for the remote entry of messages by a large number of users and the selective communication of voice messages to callers who wish to reach such users.

A further object of the present invention is to provide an improved automatic telephone directory system which is interactive with users and callers and provides for the entry of user messages and selective access to such messages by callers and users.

It is a further object of the present invention to provide an improved automatic message entry system having the selective voice communication with users and callers which permits the remote entry of different types of messages by users into the directory.

It is a still futher object of the present invention to provide an improved automatic telephone directory message system capable of handling a very large number of users; such number being larger than the facilities for storage of messages in that, statistically not all users will wish to use the directory at the same time.

It is a still further object of the present invention to provide an improved automatic telephone directory message system which provides a voice message as to the availability or unavailability of any user and a telephone number where the user may be reached, if available.

It is a still further object of the present invention to provide an improved automatic telephone directory message system which is secure in operation and selectively provides messages only to those callers who are aware of user identification number codes.

A still further object of the present invention is to provide an improved telephone directory message system which is uncomplicated in design, may be fabricated from components which are accepted for use in accordance with telephone practice and are not objectionable from the viewpoint of telephone utilities, and which may be fabricated at low cost.

Briefly described a telephone directory message system embodying the invention is adapted to be connected to a telephone line when that line is called by users or callers. The users are persons who wish to leave messages which are to be selectively communicated to callers who call the directory in order to make contact with users. The system contains means for detecting numbers representing user codes and numbers accompanying such codes which represent messages to be transmitted to the callers. When these numbers are entered, as by dialing digits by the dial of a telephone, preferably using the buttons of a dual-tone-multifrequency (DTMF) telephone set. The system may be used by any user or caller merely by calling the directory number by telephone from any remote location. Memory means are provided for storing the user code numbers and their accompanying message numbers into different locations in memory. The memory may be a random access memory (RAM) which has separate locations into which any of the user code numbers and their accompanying message numbers may be stored; no location being dedicated to any particular user. Speech synthesizer means having a vocabulary of words of speech corresponding to the message numbers are also provided in the system. The system has means, preferably a programmed microprocessor, which is responsive to the user code numbers for operating the synthesizer in accordance with the message code numbers stored in the same location as a user code number which is detected, for transmitting signals representing the words of speech of the message on the telephone line.

It is a feature of the invention to remove stale messages from the memory. Means are provided for counting incoming calls and removing the user code number and any accompanying message numbers when that user number is not accessed during the reception of the predetermined number of calls. The memory location is then available for another user who wishes to enter a message to be selectively communicated to callers who wish to reach that user.

The foregoing and other objects, features and advantages of the invention will become more apparent from a reading of the following description in connection with the accompanying drawing, the sole FIGURE of which is a block diagram of an automatic telephone directory message system embodying the invention.

Referring more particularly to the drawing, the directory message system shown therein, has a section 10 which provides coupling to the telephone line which is assigned to the system. Callers and users of the system obtain access thereto by dialing on their telephones, the telephone number of the directory's systems line. The illustrated embodiment of the system is designed to interface through a standard touch tone telephone station set. The system provides interactive operation with the users and with the callers through voice communication, and through the entry of dial digits by the user or caller on the telephone line. Dial digits which represent the user code identification numbers (called user code numbers herein) and dial tone is detected by an interceptor 12.

A main directory RAM 14, which may be a so called 1K or larger memory unit, contains the user code numbers and numbers representing messages which are entered by users on the telephone line in different locations therein. In the herein illustrated telephone system 64 bits of memory are contained in each user location in the RAM 14.

Voice communications are provided by a speech synthesizer 16 to the telephone line coupler section 10, the synthesizer may be a unit of the type which is available commercially and which has a vocabulary of words, including instructional words to inform users and callers how and when to use the directory, condition words which tell callers about the location of users, and number words (zero to nine) indicating the extension or telephone number where a user on the directory may be reached, if available.

Means for controlling this system in response to user and message numbers is provided by a microprocessor 18. The microprocessor and the RAM, like the synthesizer, may be commercially available in integrated circuit form. The microprocessor for example may suitably be a Motorola Semiconductor type 6802. That microprocessor has the capability of addressing 64K bytes of memory. With 64 bits of memory in each location for a separate user code number and associated message numbers, 1,000 users may be accommodated with approximately 16K bytes of RAM. Note that advantage is taken of the fact that not all of the subscribers will require a directory entry simultaneously; i.e., less than all possible users will be on the directory at any one time. The user code number in this embodiment of the invention has 4 decimal digits. This code allows for 9,999 different users to have access to the directory. Additional processing capacity and additional memory may be used if a large number of users are anticipated to be on the directory at the same time. Statistically, however, not all users will be on the directory, such that a RAM 14 having far fewer locations for users and their messages than potential users will generally suffice. Even a 1K RAM (128 bytes) can hold 16 individual messages and may accommodate more than a hundred users depending upon the statistical frequency of use of the directory.

In the coupler section 10, a ring detector 20, which may be coupled to the line via a neon lamp optic coupler, is turned on by ringing voltage on the telephone line by a user or caller desiring access to the line. When there is no ringing voltage present, the detector 20 provides a control level, for example a binary "1" to the microprocessor 18. During the presence of ringing voltage the microprocessor 18 receives a "0" level from the ring detector 20. The microprocessor then enables a line connector 22 to seize the line, this line connector 22 contains a relay driver 24 and a relay 26. The relay closure completes the circuit from the telephone line to a hybrid transformer 28. The line is connected via a transient protection circuit 30, if desired in order to protect the system from the line and vice versa in accordance with standard telephone practice.

The hybrid 28 transforms the two-wire telephone line into a four-wire connection to receive voice signals from the speech synthesizer 16 by way of a low-pass filter 31 and an amplifier 32. The voice signals from the synthesizer 16 are then transmitted out onto the line to the user or caller. The hybrid also isolates the interceptor 12 from the synthesizer 16 and its associated circuits which transmit signals to the line.

The interceptor 12 has a tone amplifier 34. The frequency response of the amplifier 10 is broad enough to transmit dial tone signals (350 Hz and 440 Hz, for example), as well as the row frequencies (697 Hz to 941 Hz) and column frequencies (1209 Hz to 1633 Hz) from the touch tone station. When the caller or user hangs up, dial tone is detected by a dial tone detector circuit 36. The dial tone detector circuit may have two-phased locked loops which output binary zeros to the microprocessor on lines $T_1$ and $T_2$, when a dial tone (350 Hz and 440 Hz which simultaneously occur) is detected. Then the microprocessor responds by signaling the relay driver 24 of the line connector 22. This deenergizes, the relay 26 to release the telephone line. The digits dialed by the caller or user are translated into a four-digit binary code $M_0$, $M_1$, $M_2$ and $M_3$ and a strobe (STB) pulse each time a digit is received, which occurs each time the user or caller pushes any of the keys on their touch tone station set. These five signals are inputted to the microprocessor 18. The digit signals to $M_0$ to $M_3$ and STB are obtained from a dual tone multi-frequency detector, which is known as a DTMF detector 38. A high group band pass filter 40 passes only the column frequencies to the DTMF detector. A low group band pass filter 42 passes the row frequencies to the detector. The detector 38 may be a commercially available integrated circuit which translates each of the dial digits into the four-digit binary code. The touch tone dial has facilities for special symbols in addition to the digits one through nine and zero. There are (*) and (#). Inasmuch as four binary digits $M_0$ to $M_3$ are used to represent any number up to sixteen in decimal, the twelve digit tone combinations may readily be accommodated by the DTMF detector and encoded into binary format.

The microprocessor 18 has internally thereof or as an auxilary device, a scratch pad memory 44. This may be a RAM. In microprocessors, such as the 6802, the scratch pad RAM is internally provided on the same chip with the other components of the processor. The processor also has a peripheral adapter (input/output device) such as a buffer, internally therein. The data lines of the processor are connected to the RAM and to the scratch pad memory 44. These may transmit bi-directionally an 8 bit byte or word. The scratch pad memory is also connected to the microprocessor via address and control lines 46. The address lines (16 address bits) are connected to the RAM 14. The peripheral adapter lines are connected to the synthesizer 16.

Also associated with the microprocessor 18 is a call counter 48 which counts each incoming call received on the telephone line and provides an output each time a predetermined number of calls is received, say every ten calls. The counter may be internal of the microprocessor 18. Also associated with the microprocessor is a user code detector 50 which may be comparator logic which compares each user code number stored in the RAM 14 with the user code entered from the telephone line into the microprocessor and provides an output to prevent removal or erasure of a message if the user's number is accessed at least once during the predetermined number of calls. This is in accordance with the stale entry removal feature of the invention.

The 64 bits of memory in the RAM 14 are allocated as follows:

Sixteen bits represent the 4 digit user code numbers each day a 4 bit binary coded decimal (BCD) number;

two bits provide a condition code. These bits, if for example, "0", "0", indicate that a user is on premises and available. "0", "1" represents the user is on the premises but not available. "1", "0" means that the user is not on the premises but is available to be reached by callers. "1", "1" represents that the user is not on the premises and is not available to callers.

Six bits represent the stale entry removal code; and

Forty bits remaining are ten 4 bit BCD digits which may represent the telephone number at which the user may be reached.

The entire RAM may be reset to all "1"'s or FF in hexadecimal code. All "1"'s in any location is not an allowed code by virtue of the digits of the user code number and message digits in the telephone number being in BCD format. The RAM 14 is initialized in the FF hexadecimal state. Upon entry of a user code number on the telephone line and into the microprocessor via the DTMF detector 38, the RAM is searched for a location therein containing that user code number, and the stale entry removal code associated with each user number is decremented by one, every 10 calls by the call counter 48. When, however, the user code number corresponds to the user number entered from the line, the user code detector so provides an output to reset the stale entry removal code back to 111111. If the user number is not called ever 640 calls (10 times 64—the maximum value of a 6 bit binary number). The microprocessor responds to all zeros in the stale entry removal code and causes the entire location to be reset to all ones; thus the location becomes available for use by another user.

When user codes are entered from the telephone line, the microprocessor causes the RAM to be searched for an available location of 64 bits. The user code number, the condition code and the telephone number, if any, is entered by the user in the first available location in the RAM 14. The condition code is entered by the user by dialing two digits after dialing and entering the 4 digit user code. These digits may be a 1, to indicate that he is on the premises, or a 2 to indicate he is off the premises. He then dials, for example, a 1 when he wishes to be available to callers, or a 2 if he is not available. For condition codes 1, 1 or 2, 1, he then dials the message digits which may be either a telephone extension number or a telephone number of up to 10 digits (AREA)-XXX-YYYY. The digit code and the message may be stored in scratch pad memory and read out of the scratch pad memory into the synthesizer 16 so that the user may review the message. When the message is approved, the user may enter it into the available location in RAM by dialing one of the special digits (for example, #). If the message is not properly entered the user may alternatively enter the other special digit (for example, *) and remove the message from the scratch pad memory 44 and re-enter the entire sequence consisting of the four digit code, the condition code and the telephone number, if the available condition code, 1, 1 or 2, 1 is selected. In cases where a previous message is to be deleted, the user merely enters his 4-digit user code and the digit 0 instead of the condition code, the microprocessor then removes the entire previous entry and enters all "1"'s in the location in which the previous entry was stored.

The speech synthesizer has a vocabulary of words (speech sounds) these may be the words "directory", "party", "enter", "tone", "code", "on", "off", "premises", "not" and "available". The microprocessor has a look-up table which selects these words sequentially, by outputting 6 bits on address lines to the synthesizer. Two control lines also connect to the microprocessor to the synthesizer. These are the SRT line which outputs a start signal and enables the synthesizer to read out the sequence of data bytes corresponding to the selected word to a digital to analog converter therein. The speech signals are transmitted via the amplifier 32 and the hybrid 28 over the telephone line. Bilateral control line BSY inhibits read in of a new address while the synthesizer is outputting the data corresponding to the speech words. The words may be selected either automatically or in response to data stored in the RAM 14.

More particularly, to enter data into the directory, the user dials the telephone number of the system. As soon as a connection is made, as indicated by the cessation of ringing, the microprocessor automatically operates the synthesizer to output a sequence of instructional words, for example, "directly enter tone code". The user instructs the system that he wishes either to enter a message or delete a previous message by entering a sequence of special symbol digits. For example, the special symbol digits (###) may be entered in sequence. Then the four digit user code is entered followed by the 2 digit condition code. Alternatively, the zero digit is entered to delete the previous entry. If the available condition digits are entered, the user then enters the telephone line or extension number where he may be reached. The user then hits a special symbol, such as (#). The microprocessor, then transfers the entire message from the scratch pad memory 40 to its look up table so as to sequentially address the speech synthesizer 16. The speech word is then transmitted to the user. If the user finds the entry in error, he enters the other special symbol digit, specifically (#), and starts over by entering the ### sequence. In order to accept the entry the user enters the special symbol # once. The system indicates to the user that the message is entered by sounding a "beep". The user may then hang up and the system is released from the telephone line.

In entering the message into the RAM the microprocessor first searches the RAM in one direction say from top to bottom through each of the locations for a location in which the same user number is found. The message is entered by writing the new message over the old message in that location. Should no location previously used by the user be found, the RAM is then searched from bottom to top for the first available location. The user number and its accompanying message numbers are then stored in that location. In the event that the RAM is full, this condition is signalled to the microprocessor which addresses the speech synthesizer to output a message "directory not available" to the user. If the capacity of the directory continues to be exceeded, additional memory devices (RAM chips) may be added to provide for such additional capacity as is needed to accommodate users.

When a caller calls the directory, the system responds initially in the same manner as in the case where data is to be entered into the directory. The synthesizer then outputs the words "directory enter tone code". The caller must be aware of the user code number in order to use the directory. Upon entering the user code number, the processor 18 responds by transferring the information from the location at the address of that user code number to the synthesizer and the message is read out onto the telephone line. The microprocessor searches through the RAM until it finds the user number entered by the caller. In the event that no such user number has been entered into the RAM, the processor responds by addressing the synthesizer 16 to transmit the speech words "party not on directory".

Several telephone lines may be connected to the system. A single number may be assigned to the lines and a seeker used to selectively find any of these lines which is not busy. Each line has dedicated thereto its own line connector, interceptor, and synthesizer. Only one main memory RAM is necessary. This RAM is accessed from the microprocessor via interface devices, such as peripheral interface adapters (PIA). Such devices are available as integrated circuits, for example type 6821 sold by Motorola semiconductors of Phoenix, Arizona. The access to RAM and the execution time in the microprocessor is much faster than the time needed to respond to callers and users. Accordingly, many lines can be readily handled by the system.

From the foregoing description, it will be apparent that there has been provided an improved automatic telephone directory message system, having features of capacity for a very large number of users who may enter selected messages to callers who they wish to have access to such messages. Variations and modifications in the herein described system will undoubtedly suggest themselves to those skilled in the art. Accordingly the foregoing description should be taken as illustrative and not in a limiting sense.

What is claimed is:

1. A telephone directory message system which comprises means for detecting numbers representing user codes and messages to be transmitted to callers or users which are entered on a telephone line, memory means for storing user code numbers and accompanying message numbers and having a plurality of different locations each for a separate user code number and its accompanying message number, means for writing each of said user code numbers and said message numbers which accompany them into said different locations in said memory, speech synthesizer means having a vocabulary of words of speech corresponding to said message numbers, and means responsive to said user code numbers for operating said synthesizer in accordance with the message numbers stored in the same location with said user code numbers for transmitting signals representing said speech words on said telephone lines.

2. The invention, as set forth in claim 1, wherein said synthesizer also has speech words in its vocabulary for giving first instructions to callers or users to enter user code numbers, and means for operating said synthesizer when a call is first received on said line to transmit said first instruction word on said line.

3. The invention as set forth in claim 2 wherein said synthesizer also has speech words in its vocabulary for giving second instructions to callers or users that users are not listed in the directory, and means responsive to said user code numbers entered on said line for operating said synthesizer to transmit said second instruction words when entered user code numbers do not correspond to any user code numbers stored in said memory.

4. The invention as set forth in claim 3 wherein said synthesizer has speech words in its vocabulary for giving third instructions to callers or users that all the locations in said memory for user code numbers and accompanying message numbers are occupied, and means responsive to the user code numbers entered in said memory and to the user code numbers in each of said locations for operating said synthesizer to transmit said third instruction words.

5. The invention as set forth in claim 1 wherein said message numbers include sequential digits representing the conditions that a user is on or off the premises and available or unavailable to callers and digits representing the telephone number where the user is available, and means responsive to said user code numbers entered with a certain number in the position of at least one of said condition representing digits for erasing any location in said memory containing the same user code number as entered on said line with said certain number in said condition representing digit position.

6. The invention as set forth in claim 1 further comprising a scratch pad memory, means for storing a user code number and its accompanying message numbers in said scratch pad memory, and means for transferring said stored user code number and its accompanying message numbers from said scratch pad memory into one of said locations in said first named memory where said user code number is stored or which does not have a user code number stored therein.

7. The invention as set forth in claim 6 wherein said means for storing in said scratch pad memory includes means responsive to the entry of at least a certain symbol digit on said telephone line prior to said user code numbers for enabling the storage of said user code numbers and its accompanying message numbers, and means responsive to the entry of at least another certain symbol digit after entry of said user code and message numbers and for operating said synthesizer to transmit speech words corresponding to the numbers stored in said scratch pad memory on said line.

8. The invention as set forth in claim 7 wherein said transferring means includes means responsive to the entry of at least still another special symbol digit for enabling the operation of said transferring means.

9. The invention as set forth in claim 1 further comprising means for removing from any of said locations in said memory the user number and its accompanying message numbers if said user number is not entered on said line upon occurrence of a predetermined number of said calls.

10. The invention as set forth in claim 9 wherein said removing means comprises means for storing in each of said memory locations a plurality of digits representing a certain number, counting means for counting said calls, means for changing incrementally the number represented by the plurality of digits each time said counting reaches a certain count, means responsive to the entry of a user number corresponding to the user number stored in said memory location for resetting said digits to represent said certain number, and means for removing said user number and its accompanying message numbers from said location when said digits represent a number differing from said certain number by a predetermined numerical value.

11. The invention as set forth in claim 10 wherein said plurality of digits are binary digits which are all "1"'s, said changing means includes means for decrementing the number represented by said binary digits by one when said counting means reaches said certain count, and said user number entry means comprises means for resetting said binary digits to all "1"'s, and said removing means comprises means for entering digits in said location which represent the absence of numbers wherein when said binary digits are all "0"'s.

12. The invention as set forth in claim 1 wherein said detecting means comprises interceptor means for receiving digit codes transmitted on said line from the dial of a telephone of a caller and translating said codes into binary coded digits.

13. The invention as set forth in claim 12 wherein said digit codes are tone codes, and said translating means includes a DTMF detector responsive to different combinations of tones of different frequencies for providing said binary coded digits.

14. The invention as set forth in claim 12 further comprising means responsive to ringing signals on said line for connecting said line to said detecting means, and means included in said interceptor means responsive to the presence of dial tone on said line for disconnecting said lines from said detecting means.

15. The invention as set forth in claim 14 further comprising a hybrid circuit connecting said connecting means to said detecting means, and means for applying the speech word signals from said synthesizer to said hybrid for transmission on said line.

16. The invention as set forth in claim 15 further comprising programmed microprocessor connected to said interceptor means, said memory and said synthesizer means for generating digital signals in response to said user code numbers and message numbers, storing such signals in said memory and selecting said speech word signals from said synthesizer in accordance with said digital signals.

17. The invention as set forth in claim 1 wherein said writing means and said synthesizer operating means comprises programmed processor means for processing said user code numbers and addressing said memory for writing digital signals corresponding thereto in said locations therein and for encoding said digital information into digital signals for selecting said speech word signals corresponding to said digital signals sequentially from said synthesizer.

* * * * *